(12) United States Patent
Kramer et al.

(10) Patent No.: US 11,669,334 B2
(45) Date of Patent: Jun. 6, 2023

(54) JUST-IN-TIME CONTAINERS

(71) Applicant: Google LLC, Mountain View, CA (US)

(72) Inventors: Dominic Kramer, Mountain View, CA (US); Ryan Day, Mountain View, CA (US)

(73) Assignee: Google LLC, Mountain View, CA (US)

( * ) Notice: Subject to any disclaimer, the term of this patent is extended or adjusted under 35 U.S.C. 154(b) by 416 days.

(21) Appl. No.: 16/677,805

(22) Filed: Nov. 8, 2019

(65) Prior Publication Data
US 2021/0141645 A1    May 13, 2021

(51) Int. Cl.
*G06F 9/4401* (2018.01)
*G06F 8/61* (2018.01)
*G06F 9/445* (2018.01)

(52) U.S. Cl.
CPC .............. *G06F 9/4401* (2013.01); *G06F 8/61* (2013.01); *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 8,219,987 B1 * | 7/2012 | Vlaovic | G06F 9/448 718/1 |
| 9,823,915 B1 * | 11/2017 | Maloney | G06F 9/4411 |
| 2005/0091227 A1 * | 4/2005 | McCollum | G06F 8/71 |

* cited by examiner

*Primary Examiner* — Paul Yen
(74) *Attorney, Agent, or Firm* — Honigman LLP; Brett A. Krueger

(57) ABSTRACT

A method for configuring and deploying execution environments for software applications includes receiving a bootstrap execution environment from a data store, the bootstrap execution environment including a software application, the software application including a manifest of dependencies. The method includes executing the bootstrap execution environment and determining whether an enhanced execution environment is available from the data store. When the enhanced execution environment is available from the data store, the method includes receiving the enhanced execution environment from the data store and enhancing the bootstrap execution environment based on the received enhanced execution environment. When the enhanced execution environment is not available from the data, the method includes enhancing the bootstrap execution environment based on the manifest of dependencies to create the enhanced execution environment and storing the enhanced execution environment in the data store. The method also includes executing the software application.

16 Claims, 11 Drawing Sheets

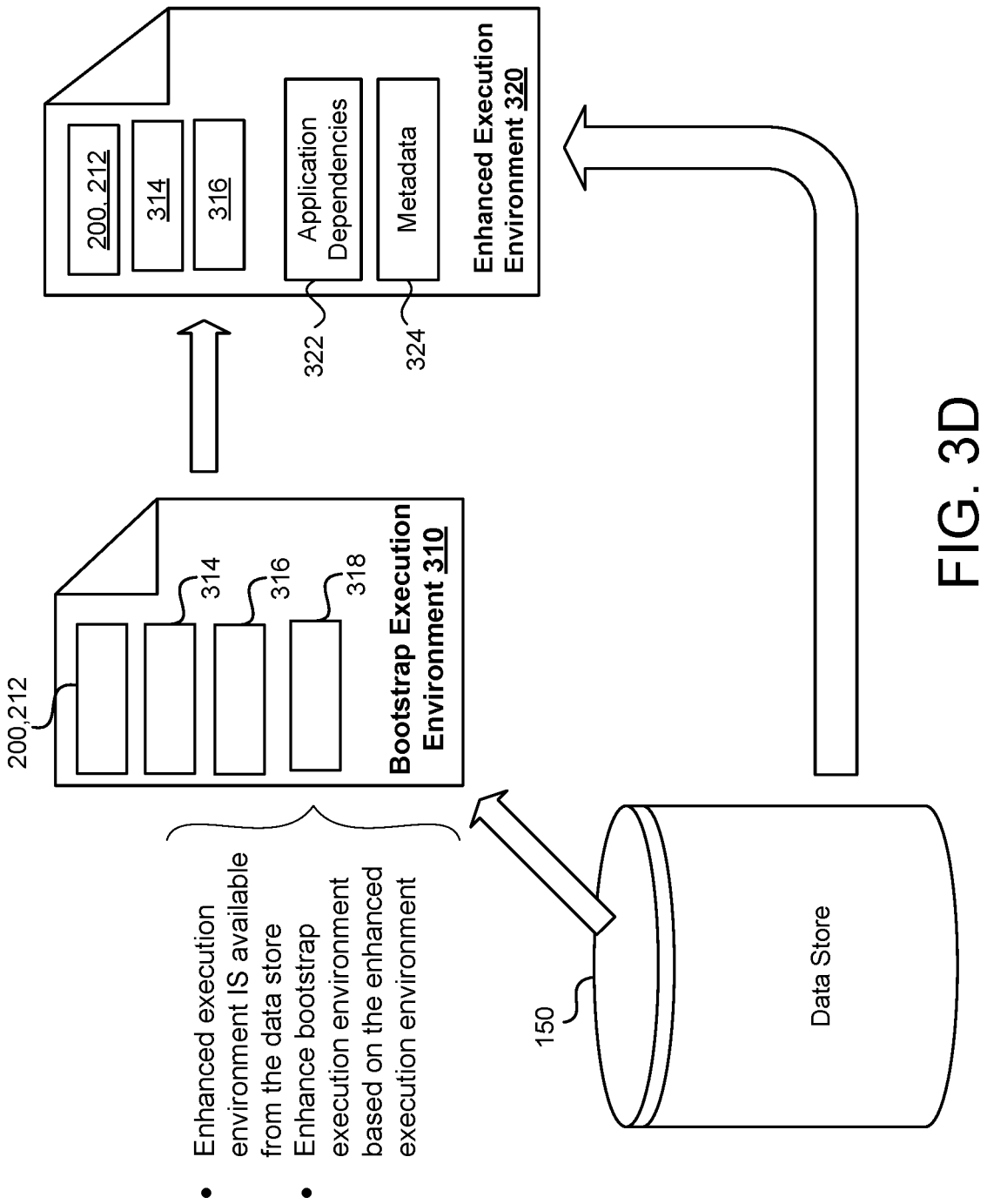

JUST-IN-TIME CONTAINERS

TECHNICAL FIELD

This disclosure relates to efficiently configuring and deploying execution environments for software applications.

BACKGROUND

Container technologies offer the prospect of rapidly scaling applications and services without incurring the large overhead associated with traditional virtualization environments. Source code for software applications may be developed and tested in a software development environment prior to operational deployment in a container. Container builders are publically available for building an output container from input source code. These container builders generally include instructions and build tools that describe how to package the source code into corresponding containers for deployment. Container builders often produce heavyweight container images that contain both the build-time tools, such as software development kits, compilers, and/or debuggers, as well as the run-time environment for executing the output container. These heavyweight container images are larger and contain unnecessary contents/components when deployed or distributed to customers. For instance, including a compiler in a deployed container is unnecessary as it adds heft to the container as well as introduces attack vectors and security vulnerabilities to packaged deployments. Lighter-weight execution environments include only the components/contents needed to support the application or service. However, this streamlining of the execution environment may come at the expense of increased configuration burden. Software development platforms may not be optimized for configuring and deploying application execution environments. Moreover, software developers may not be skilled or knowledgeable in configuring and deploying lightweight execution environments, or may not be privileged to configure or deploy execution environments. As a result, software developers wanting to deploy applications in lightweight execution environments face inefficiencies.

SUMMARY

Aspects of this disclosure relate to configuring and deploying execution environments for software applications. One aspect provides a method including receiving, at data processing hardware, a bootstrap execution environment from a data store, the bootstrap execution environment including a software application having a manifest of dependencies. The method further includes executing, by the data processing hardware, the bootstrap execution environment, causing the data processing hardware to perform operations including determining whether an enhanced execution environment is available from the data store. When the enhanced execution environment is available from the data store, the operations further include receiving the enhanced execution environment from the data store, enhancing the bootstrap execution environment based on the enhanced execution environment, and executing the software application. When the enhanced execution environment is not available from the data store, the operations include enhancing the bootstrap execution environment based on the manifest of dependencies to create the enhanced execution environment, storing the enhanced execution environment in the data store, and executing the software application.

Implementations of the disclosure may include one or more of the following optional features. In some implementations, the method includes annotating, by the data processing hardware, the enhanced execution environment in the data store to indicate at least one of a version of the software application, an operating system version associated with the enhanced execution environment, or a processor architecture associated with the enhanced execution environment. Determining whether the enhanced execution environment is available from the data store may include determining whether the enhanced execution environment is compatible with at least one of the software application, an operating system version associated with the bootstrap execution environment, or a processor architecture associated with the bootstrap execution environment.

The method may further include receiving, at the data processing hardware, a build request for the software application, configuring, by the data processing hardware, the bootstrap execution environment based on the software application, and storing, by the data processing hardware, the bootstrap execution environment in the data store. Enhancing the bootstrap execution environment based on the manifest of dependencies may include installing application dependencies. In some examples, the software application is one of a JavaScript application, a Python application, or a Ruby application. The application dependencies may include at least one of a support library, an architecture-specific binary module, or a just-in-time compiled module. In some implementations, the method includes, after enhancing the bootstrap execution environment based on the manifest of dependencies to create the enhanced execution environment, identifying a set of updated files including files added or modified by enhancing the bootstrap execution environment based on the manifest of dependencies. Storing the enhanced execution environment in the data store may include storing the set of updated files in the data store. In some examples, the bootstrap execution environment includes a container image and the data store includes a container registry.

Another aspect of the disclosure provides a system for configuring and deploying execution environments for software applications. The system includes data processing hardware and memory hardware in communication with the data processing hardware. The memory hardware stores instructions that when executed on the data processing hardware cause the data processing hardware to perform operations. The operations include receiving a bootstrap execution environment from a data store, the bootstrap execution environment including a software application having a manifest of dependencies. The operations further include executing the bootstrap execution environment, causing the data processing hardware to perform further operations that include determining whether an enhanced execution environment is available from the data store. When the enhanced execution environment is available from the data store, the operations further include receiving the enhanced execution environment from the data store, enhancing the bootstrap execution environment based on the enhanced execution environment, and executing the software application. When the enhanced execution environment is not available from the data store, the operations include enhancing the bootstrap execution environment based on the manifest of dependencies to create the enhanced execution environment, storing the enhanced execution environment in the data store, and executing the software application.

Implementations of the disclosure may include one or more of the following optional features. In some implementations, the operations further include annotating the enhanced execution environment in the data store to indicate at least one of a version of the software application, an operating system version associated with the enhanced execution environment, or a processor architecture associated with the enhanced execution environment. Determining whether the enhanced execution environment is available from the data store may include determining whether the enhanced execution environment is compatible with at least one of the software application, an operating system version associated with the bootstrap execution environment, or a processor architecture associated with the bootstrap execution environment.

The operations may further include receiving a build request for the software application, configuring the bootstrap execution environment based on the software application, and storing the bootstrap execution environment in the data store. Enhancing the bootstrap execution environment based on the manifest of dependencies may include installing application dependencies. In some examples, the software application is one of a JavaScript application, a Python application, or a Ruby application. The application dependencies may include at least one of a support library, an architecture-specific binary module, or a just-in-time compiled module. In some implementations, the operations include, after enhancing the bootstrap execution environment based on the manifest of dependencies to create the enhanced execution environment, identifying a set of updated files including files added or modified by enhancing the bootstrap execution environment based on the manifest of dependencies. Storing the enhanced execution environment in the data store may include storing the set of updated files in the data store. In some examples, the bootstrap execution environment includes a container image and the data store includes a container registry.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3E are schematic views of building an execution environment for executing a software application.

Like reference symbols in the various drawings indicate like elements.

DETAILED DESCRIPTION

Figure 1:
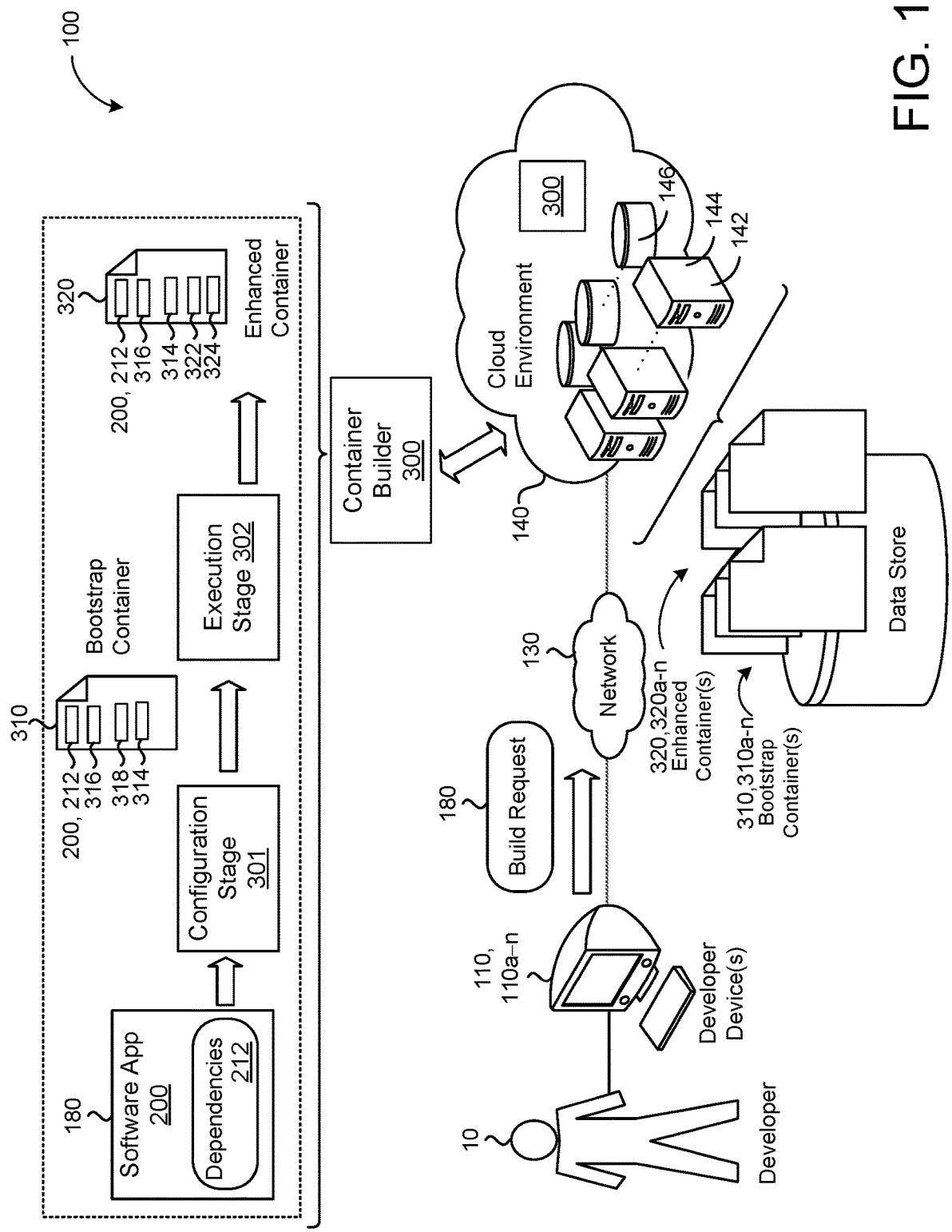
FIG. 1 is a schematic view of an example environment for configuring and deploying an application execution environment.

Software applications may be developed in a software development environment before being deployed operationally in an application execution environment. Containers are emerging as a preferred application execution environment for deploying software applications. Container technologies offer the prospect of rapidly scaling applications and services without incurring the large overhead associated with traditional virtualization environments. Multiple containerized applications may run on a single host computer, accessing the same underlying operating system. Furthermore, containerized applications may be run on a variety of underlying operating systems and/or computer or processor architectures. Container builders are publically available for building container images from input source code. These container builders typically produce heavyweight container images containing build-time tools, such as software development kits, compilers, and/or debuggers, as well as the execution-time environment needed for executing the software application. These heavyweight container images are large and often contain unnecessary contents/components when deployed/distributed. For instance, including a compiler in a deployed container is unnecessary as it adds heft to the container, and it introduces attack vectors and security vulnerabilities to packaged deployments. Configuring and deploying container images requires time, effort, and skill. The container image may need to be reconfigured each time the software application is updated. Frequent reconfiguration adds to the cost and effort of software development.

Lighter-weight execution environments include only the components/contents needed to support the application or service, e.g., without software development contents/components. However, specialized skill or knowledge may be required to configure and deploy a lighter-weight execution environment. Configuration may require identifying software development contents/components to be omitted as well as identifying necessary execution-time contents/components to be included in the execution environment. In short, the application execution environment may be substantially different from the software development environment. For instance, the software development environment may include web browsers, e-mail clients, revision control systems, and/or a graphical display optimized for ease of software development. The application execution environment, however, may be optimized for reliable, efficient execution of deployed applications. Software developers may not be skilled or knowledgeable in configuring and deploying lightweight execution environments, or may not be privileged to configure or deploy execution environments.

Container builders are publically available for building generic container images without requiring deep mastery of container configuration best practices. These container builders, however, build containers from static images. That is, a static container image contains the environment for initial or "bootstrap" execution of the application. While this approach may be sufficient for architecture-independent or architecture-agnostic software applications, software applications may execute more efficiently after customizing or enhancing their execution environment. For example, the software application may install contents dynamically, such as architecture-specific binary modules, support libraries, or other files, or the application run-time environment may compile source code or bytecode to architecture-specific machine code to improve application performance. Accordingly, generic container-building tools that build containers from static images lack the ability to capture these dynamic execution-time enhancements or update the container image to reflect the execution-time architecture-specific enhancements. Each time the application is restarted; these execution-time enhancements are performed again. Executing heavyweight container-configuration tools within the container may be able to capture these dynamic execution-time enhancements at the expense of adding heft as well as requiring time, effort, and skill to configure and/or deploy the container. Implementations herein are directed toward methods and systems of efficiently configuring and deploying secure execution environments (e.g., containers) for software applications, including capturing dynamic and/or architecture-specific enhancements tailored to the execution environment by the software application for use in subsequent executions of the software application.

Referring to FIG. 1, in some implementations, a system 100 includes a developer device 110, 110a-n associated with a software developer 10, who may communicate, e.g., via a network 130, with a remote system 140. The remote system 140 may be a distributed system (e.g., cloud environment) having scalable/elastic resources 142. The resources 142 include computing resources (e.g., data processing hardware) 144 and/or storage resources (e.g., memory hardware) 146. The software developer 10 may use the developer device 110 to develop a software application 200 for execution on the remote system 140. The remote system 140 also executes a container builder 300 for building one or more secure execution environments 310, 320 (e.g., containers) for running the software application 200 on the remote system 140 independent of how the application 200 was developed/created by the developer 10. As opposed to generic container-building tools (e.g., Docker) that require the developer 10 to provide a configuration associated with instructions for building a container to run the software application 200, the container builder 300 is configured to automatically configure a bootstrap execution environment 310 (e.g., bootstrap container 310) based on the software application 200 received from the developer device 110 during a configuration stage 301. Here, the bootstrap execution environment 310 is associated with a static container image having static contents. Notably, and in contrast to workflows used in generic container building tools (e.g., Docker), the configuration stage 301 configures the static image associated with the bootstrap execution environment 310 without running commands for creating dynamic content. The bootstrap execution environment 310 may include tooling 316 for building or configuring execution environments 310, 320. In some implementations, the tooling 316 is a set of command-line tools for creating, configuring, and managing containers. Other forms of tooling 316 are possible, including remote and/or web-based services. In some implementations, the container builder 300 configures the bootstrap execution environment 310 to include a set of startup instructions 318. The startup instructions 318 define steps for the container builder 300 to take when executing the bootstrap execution environment 310. The use of the tooling 316 and startup instructions 318 are described in greater detail below with reference to FIGS. 3A-3E.

Thereafter, during an execution stage 302, the container builder 300 is configured to run/execute the bootstrap execution environment 310 to build/create an enhanced execution environment 320 with dynamic content (e.g., application dependencies 322). Specifically, the container builder 300 builds the enhanced execution environment 320 for the software application 200 by enhancing the bootstrap execution environment 310 with dynamic content (e.g., application dependencies 322). That is, during the execution stage 302, the container builder 300 executes the software application 200 in the bootstrap execution environment 310. The container builder 300 and/or the software application 200 may create dynamic content (e.g., application dependencies 322) based on the manifest of dependencies 212 of the software application 200, thereby enhancing the bootstrap execution environment 310 with the dynamic content 322 to create the enhanced execution environment 320. As a result, the container builder 300 allows a developer 10 to build, and optionally deploy, an enhanced execution environment 320, including dynamic content 322, for running a software application 200 on the remote system 140 without requiring the developer 10 to provide a configuration (e.g., a Dockerfile) that provides instructions on how static and dynamic content should be described in images for building the container.

Figure 5:
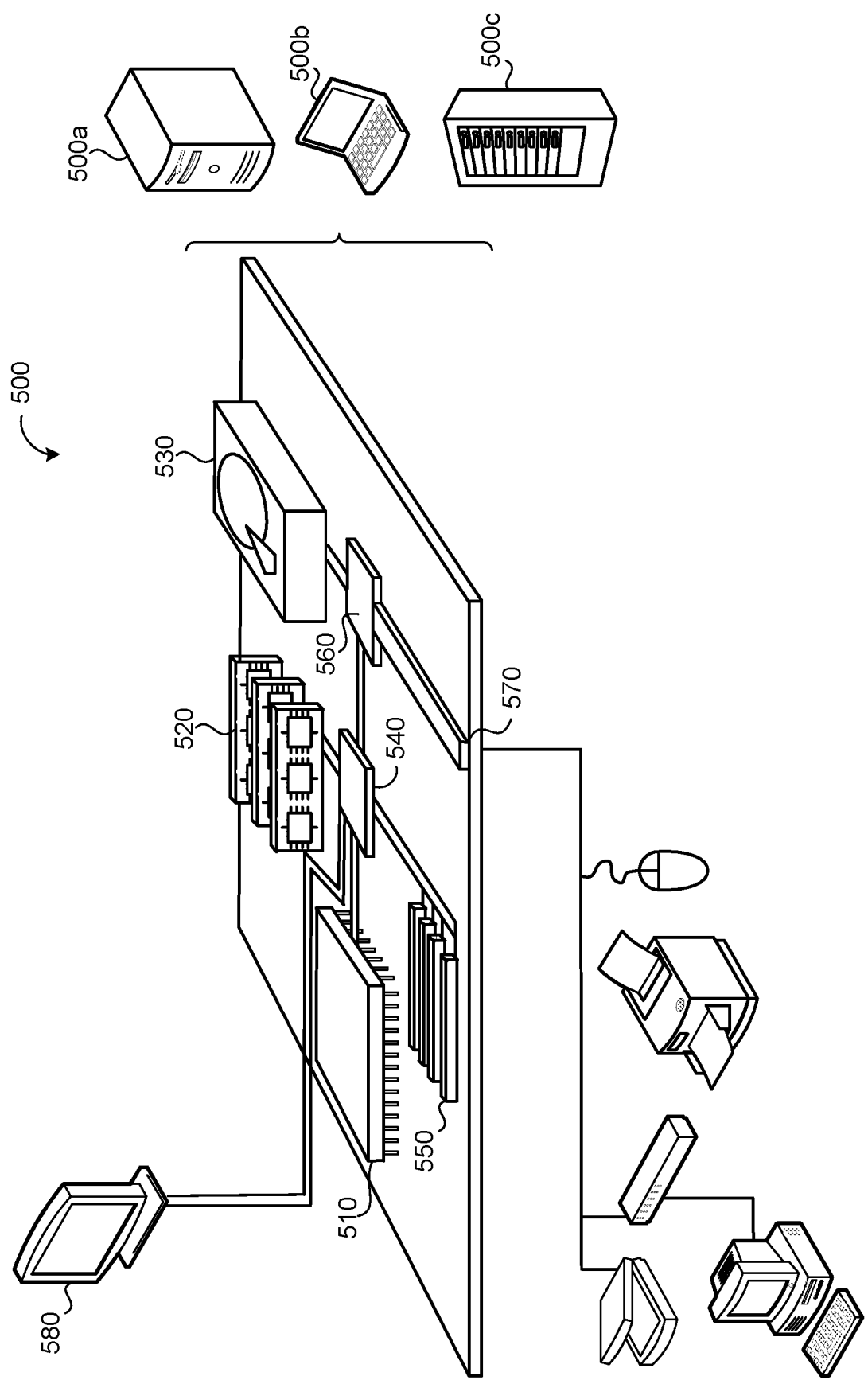
FIG. 5 is a schematic view of an exemplary computing device.

In some implementations, the remote system 140 includes a data store 150 storing one or more bootstrap execution environments 310, 310a-n and one or more enhanced execution environments 320, 320a-n within memory hardware 146, 520 (FIG. 5). In some examples, the data store 150 includes a container registry and each execution environment 310, 320 is associated with a respective containerized software application 200. In these examples, the bootstrap execution environment 310 may be referred to as a 'bootstrap container' associated with a static image having static contents (e.g., manifest of dependencies 212) while the enhanced execution environment 320 may be referred to as an 'enhanced container' associated with a container image having content 322 (e.g., application dependencies) dynamically created during execution of the bootstrap execution environment 310 (e.g., at the execution stage 302). Each execution environment 310, 320 may include an identifier 314 (e.g., tag) identifying the software application 200 associated with the execution environment 310, 320. The enhanced execution environment 320 may also include metadata 324 indicating aspects of the enhanced execution environment 320, such as the operating system version and/or the processor architecture of the remote system 140 that built the enhanced execution environment 320.

In the example shown, the container builder 300 receives a build request 180 from the developer device 110 to build an execution environment 310, 320 for a software application 200 developed locally by the developer 10. The build request 180 may simply include the software application 200 including the manifest of dependencies 212. The build request 180 may also include the identifier 314 (e.g., tag) identifying the software application 200 in addition to or in lieu of the software application 200, and the container builder 300 may use the identifier 314 to retrieve the bootstrap execution environment 310 associated with the software application 200 from the data store 150. Here, the bootstrap execution environment 310 is associated with a static image only containing information about the content.

As will be described in greater detail below, after receiving the bootstrap execution environment 310, the container builder 300 may run the bootstrap execution environment 310 and determine whether an enhanced execution environment 320 is available from the data store 150, e.g., was previously created and stored in the data store 150. When the enhanced execution environment 320 is available, the container builder 300 may retrieve at least the application dependencies 322 (e.g., dynamic content) associated with the enhanced execution environment 320 from the data store 150 and enhance the bootstrap execution environment 310 with the application dependencies 322 that were dynamically created during a previous initial run of the bootstrap execution environment 310. The bootstrap execution environment 310 may include tooling 316 for building or configuring execution environments 310, 320. In some examples, the bootstrap execution environment 310 uses the tooling 316 to configure the enhanced execution environment 320 and store the enhanced execution environment 320 in the data store 150. In this scenario, since the bootstrap execution environment 310 was already run once to create the enhanced execution environment 320, any subsequent instances of running the bootstrap execution environment 310 will forgo running the startup commands to create the dynamic content (e.g., application dependencies) because the dynamic content can simply, and more efficiently, be retrieved from the data store 150.

The term software application 200 (i.e., a software resource) may refer to computer software that causes a computing device (e.g., data processing hardware 144, 500 (FIG. 5)) to perform a task. Thus, the software application 200 may correspond to any type or form of software, file, and/or executable code that may be installed, run, deployed, and/or otherwise implemented on the distributed system (e.g., remote system 140). In some examples, a software application 200 may be referred to as an "application," an "app," or a "program." Example applications include, but are not limited to, system diagnostic applications, system management applications, system maintenance applications, word processing applications, spreadsheet applications, messaging applications, web browser applications, media streaming applications, social networking applications, security applications, and gaming applications. The software application 200 may be expressed in one or more programming languages, including high-level and structured programming languages, such as C/C++, Java, Python, Ruby, Perl, or JavaScript and may be referred to as a C/C++ application, a Java application, a Python application, a Ruby application, a Perl application, or a JavaScript application. The software application 200 may be expressed in other forms, frameworks, and/or programming languages as well. For example, a JavaScript application, developed in the Node.js framework may be referred to as a Node.js application or a JavaScript application.

In some examples, the software application 200 includes the manifest or listing of dependencies 212. The manifest of dependencies (interchangeably referred to as 'dependency manifest') 212 may enumerate files and/or software libraries or modules used or accessed by the software application 200 during execution on the remote system 140. The dependency manifest 212 may include architecture-specific and/or programming-language-specific support libraries used by the software application 200. For example, the dependency manifest 212 may include the NumPy scientific computing package for the Python programming language. The manifest of dependencies 212 may be explicitly configured by the software developer 10 in order to configure an execution environment 310, 320 on the remote system 140. In some examples, the manifest of dependencies 212 is implied by the software application 200. For instance, the software application 200 may include statements requiring or importing support libraries. The software application 200 may include the statement "require ('urlib') to indicate a dependency on a URL-parsing support library." Collectively, such statements may be considered part of the manifest of dependencies 212.

The bootstrap execution environment 310 may contain the software application 200 in a complete file system containing everything needed to initially execute the software application 200, e.g., code, runtime, system tools, and libraries, such that the software applications 200 is able to execute consistently regardless of the operating environment. In some examples, the developer device 110a-n builds the bootstrap execution environment 310 based on the software application 200. In this case, the remote system 140 receives the bootstrap execution environment 310 from the developer device 110a-n and may store the bootstrap execution environment 310 in the data store 150. In these examples, the build request 180 received from the developer device 110 may include the bootstrap execution environment 310. The execution environments 310, 320 stored in the data store 150 may be indexed and/or catalogued and/or assigned the identifier 314 for later retrieval from the data store 150. The data store 150 may use "tags" or other annotations to represent the identifiers 314 assigned to each execution environment 310, 320 to facilitate subsequent lookup and retrieval. The identifier 314 may identify the software application 200 associated with the execution environments and/or may specifically identify the execution environments 310, 320. As such, a build request 180 from a developer device 110a-n may include one or more identifiers 314 identifying the software application 200 and/or the bootstrap execution environment 310. The data store 150 may include security features, such as authentication to protect against unauthorized access to the execution environment 310, 320 or the software application 200.

Figure 2A:
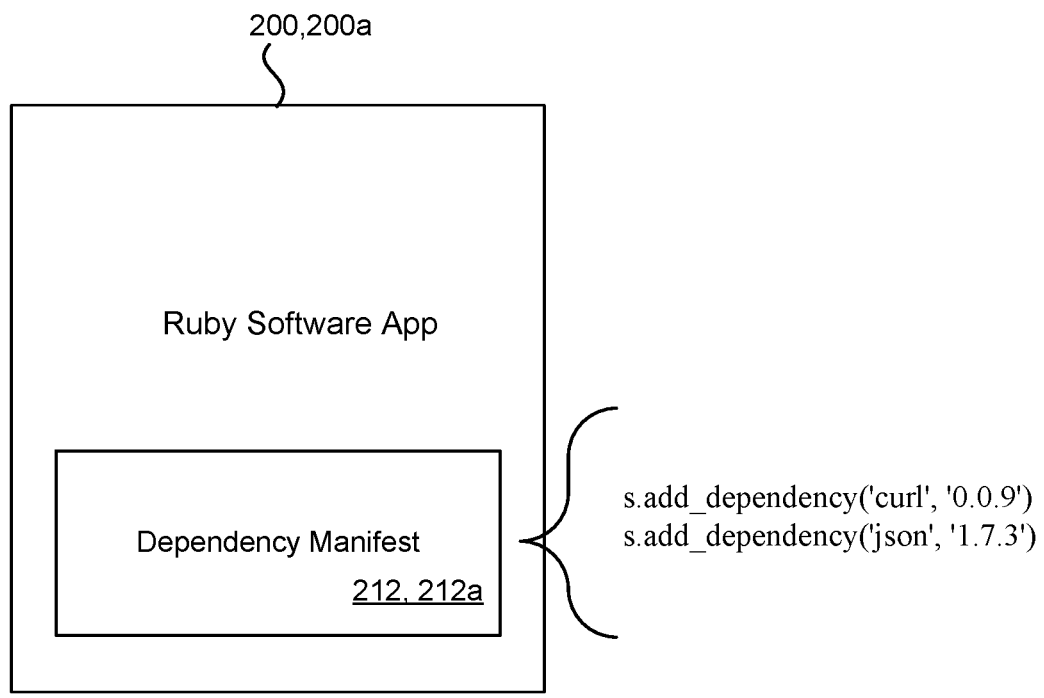
FIGS. 2A-2C are schematic views of software applications and respective manifests of dependencies.
Figure 2B:
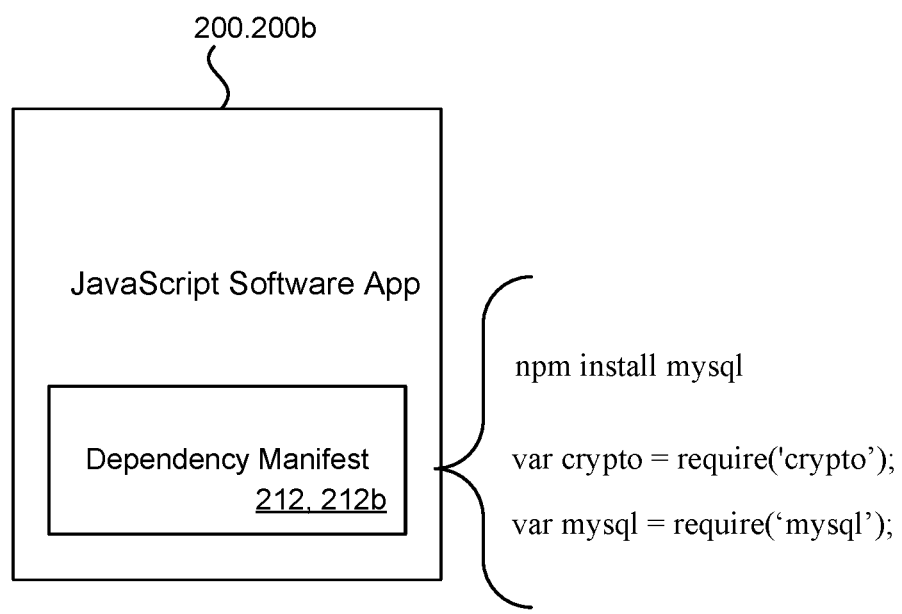
Figure 2C:
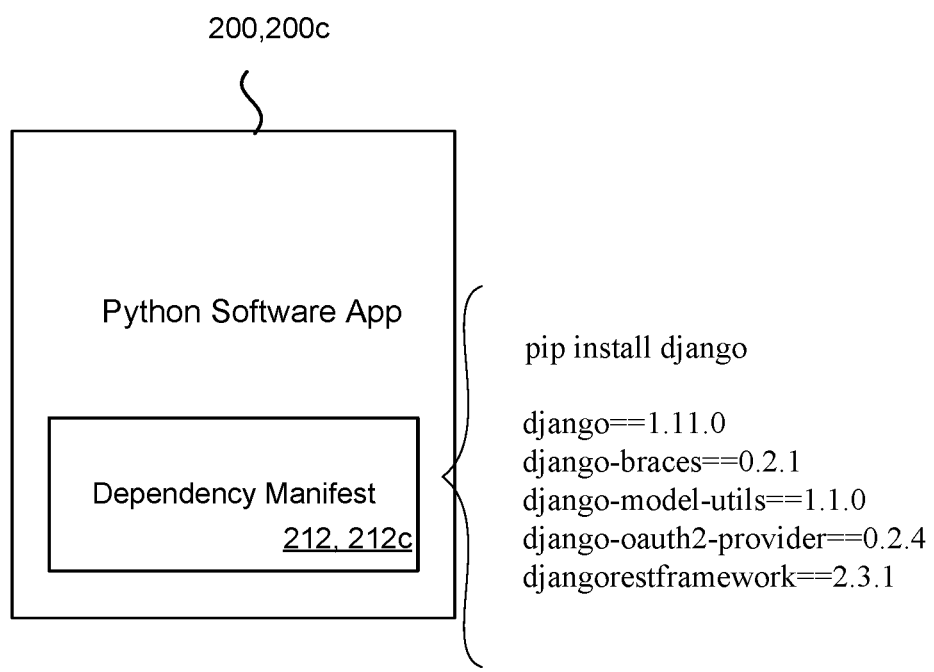

FIGS. 2A-2C are schematic views of software applications 200, 200a-c and respective manifests of dependencies 212, 212a-c. FIG. 2A shows an example Ruby software application 200a including a ".gemspec" file enumerating a manifest of dependencies 212a including runtime commands for dynamically creating application dependencies 322. Here, application dependencies 322 for the Ruby software application 200a are dynamically created upon executing the manifest of dependencies 212a in a bootstrap execution environment 310, and include URL processing (curl) and JSON data interchange format (json) support libraries. In some examples, the ".gemspec" file includes statements indicating specific versions or suitable ranges of versions of application dependencies 322 that will be dynamically created when the Ruby software application 200a is run in the bootstrap execution environment 310. Here, the ".gemspec" file indicates that version 0.0.9 and version 1.7.3 are application dependencies 322 for the Ruby software application 200a. In some examples, the ".gemspec" file includes the statement "s.add_dependency ('json', '~>2.1')" to indicate that json support libraries greater than 2.1 but less than 3.0 are application dependencies 322 for the Ruby software application 200a. The container builder 300 may enhance the bootstrap execution environment 310 when the Ruby software application 200a is run in the bootstrap execution environment 310 by creating application dependencies 322 based on the manifest of dependencies 212 enumerated in the ".gemspec" file. Other techniques for enhancing the bootstrap execution environment 310 for the Ruby software application 200a are possible. The container builder 300 may store the enhanced execution environment 320 in the data store 150.

Referring to FIG. 2B, an exemplary Node.js software application (e.g. JavaScript application 200b) is shown. The Node.js software application 200b includes package manager (npm) commands enumerating a manifest of dependencies 210b including runtime commands for dynamically creating application dependencies 322. Here, the package manager commands indicate that a database (mysql) package is an application dependency 322 that will be dynamically created when the Node.js software application 200b is run in the bootstrap execution environment 310. In some examples, the container builder 300 enhances the bootstrap execution environment 310 by executing the package manager commands to dynamically create application dependencies 322 when the Node.js software application 200b is run in the bootstrap execution environment 310. The Node.js software application 200b includes JavaScript statements further enumerating the manifest of dependencies 212. Here, the JavaScript statements indicate that cryptography ('crypto') and database ('mysql') support libraries are also application dependencies 322 that will be dynamically created when the Node.js software application 200b is run in the bootstrap execution environment 310. In some examples, the container builder 300 executes the Node.js software application 200b in a JavaScript engine including a Just in Time (JIT) compiler. The container builder 300 may cause the JIT compiler to compile the Node.js software application 200b to more efficient machine code, e.g. into a just-in-time compiled module, to enhance the bootstrap execution environment 310. In some implementations, the container builder 300 may execute the package manager commands and execute the Node.js software application 200b to dynamically create application dependencies 322 for the Node.js software application 200b. Other techniques for enhancing the bootstrap execution environment 310 for the Node.js software application 200b are possible. The container builder 300 may store the enhanced execution environment 320 in the data store 150.

Referring to FIG. 2B, an exemplary Python software application 200c is shown. Similar to the Node.js software application 200b, the Python software application 200c includes package manager (pip) commands enumerating a manifest of dependencies 212 including runtime commands for dynamically creating application dependencies 322. Here, the package manager commands indicate that a web framework (django) package is an application dependency 322 that will be dynamically created when the Python software application 200c is run in the bootstrap execution environment 310. The Python software application 200c includes Python statements further enumerating the manifest of application dependencies 212. Here, the Python statements indicate that specific versions of django (django==1.11.0, django-braces==0.2.1, django-model-utils==1.1.0, django-oauth2-provider==0.2.4, djangorestframework==2.3.1) support libraries are also application dependencies 322 that will be dynamically created when the Python software application 200c is run in the bootstrap execution environment 310. In some implementations, the container builder 300 executes the package manager commands and executes the Python software application 200c to dynamically create application dependencies 322 for the Python software application 200c. Other techniques for enhancing the bootstrap execution environment 310 for the Python software application 200c are possible. The container builder 300 may store the enhanced execution environment 320 in the data store 150.

Figure 3A:
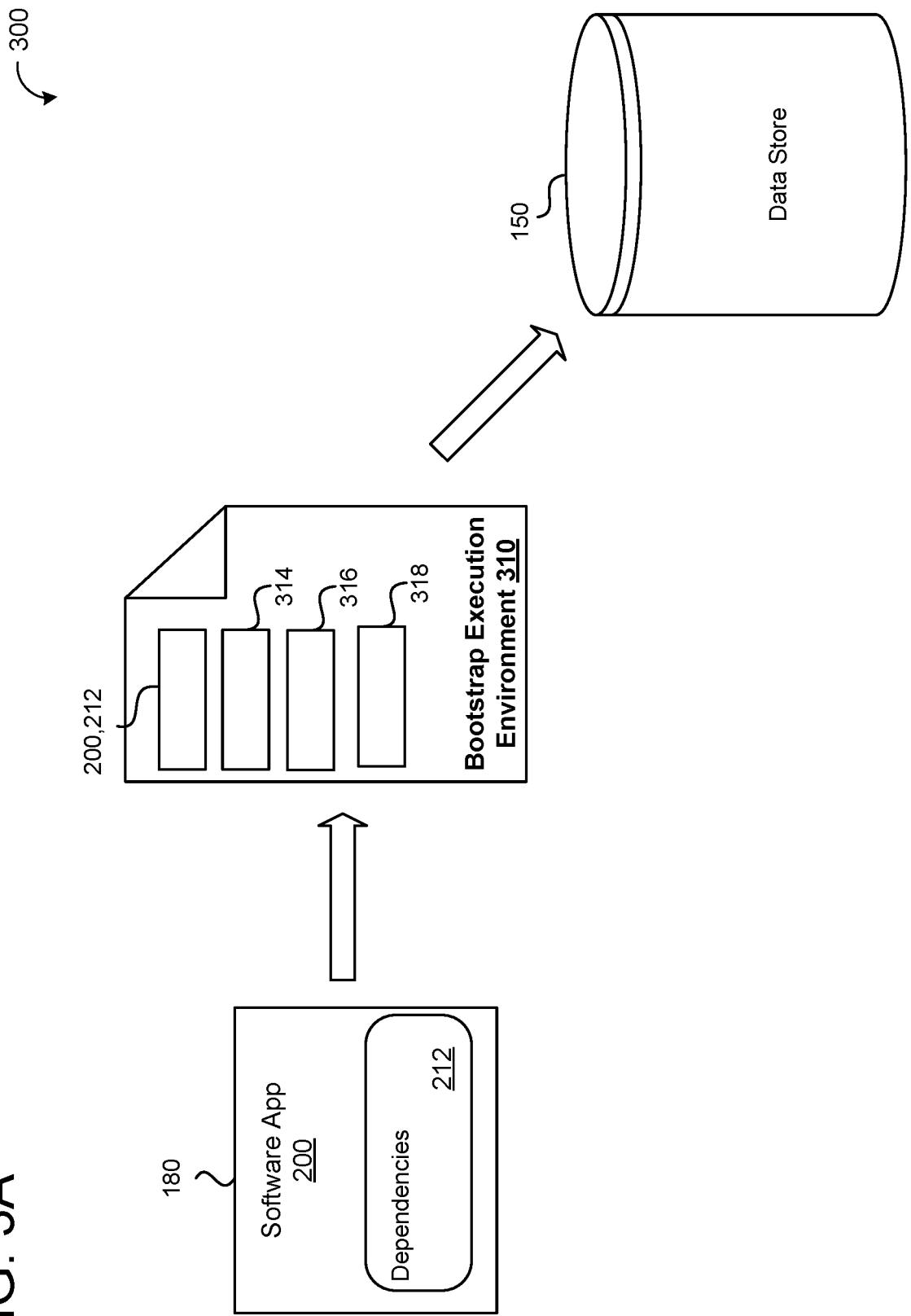

FIGS. 3A-3E show schematic views of the container builder 300 building an enhanced execution environment 320 for a software application 200. Referring to FIG. 3A, the configuration stage 301 (FIG. 1) of the container builder 300 is shown. In some examples, the container builder 300 receives a build request 180. Here, the build request 180 simply includes the software application 200, including the manifest of dependencies 212. During the configuration stage 301, the container builder 300 configures and builds a bootstrap execution environment 310 for the software application 200. The bootstrap execution environment 310 may contain the software application 200 in a static image, including a complete file system containing everything needed to initially execute the software application 200, e.g., code, runtime, system tools, and libraries, such that the software applications 200 is able to execute consistently regardless of the operating environment. In some examples, the container builder 300 configures the static image (e.g., bootstrap execution environment 310) without creating dynamic content, i.e. without execution-time architecture-specific and/or dynamic application dependencies 322.

The container builder 300 may configure the bootstrap execution environment 310 to include tooling 316 for building or configuring execution environments 310, 320. In some implementations, the tooling 316 is a set of command-line tools for creating, configuring, and managing containers. The tooling 316 may also be capable of storing the enhanced execution environment 320 in the data store 150. For instance, FIG. 3A shows the container builder 300 storing the bootstrap execution environment 310 in the data store 150. As described in greater detail below with respect to the execution stage 302, the tooling 316 may also be capable of interacting with the data store 150, e.g. to determine whether an enhanced execution environment 320 is available. In some examples, the tooling 316 is capable of execution-environment introspection. That is, the tooling 316 may be capable of determining what files in an execution environment, e.g. the bootstrap execution environment 310, were added or modified during the process of enhancing the bootstrap execution environment 310 to create the enhanced execution environment 320. In some implementations, the container builder 300 configures the bootstrap execution environment 310 to include a set of startup instructions 318. The startup instructions 318 define operations (e.g., steps) for the container builder 300 to perform when executing the bootstrap execution environment 310 during the execution stage 302. The container builder 300 may use the tooling 316 included in the bootstrap execution environment 310 when executing the steps of the startup instructions 318. The container builder 300 may use the tooling 316 to upload a container image, including the bootstrap execution environment 310, to the container registry (e.g. data store 150). The container builder 300 may add an identifier 314 (e.g., tag) to the bootstrap execution environment 310 identifying the software application 200 associated with the bootstrap execution environment 310. The identifier 314 may facilitate subsequent lookup and retrieval.

Figure 3B:
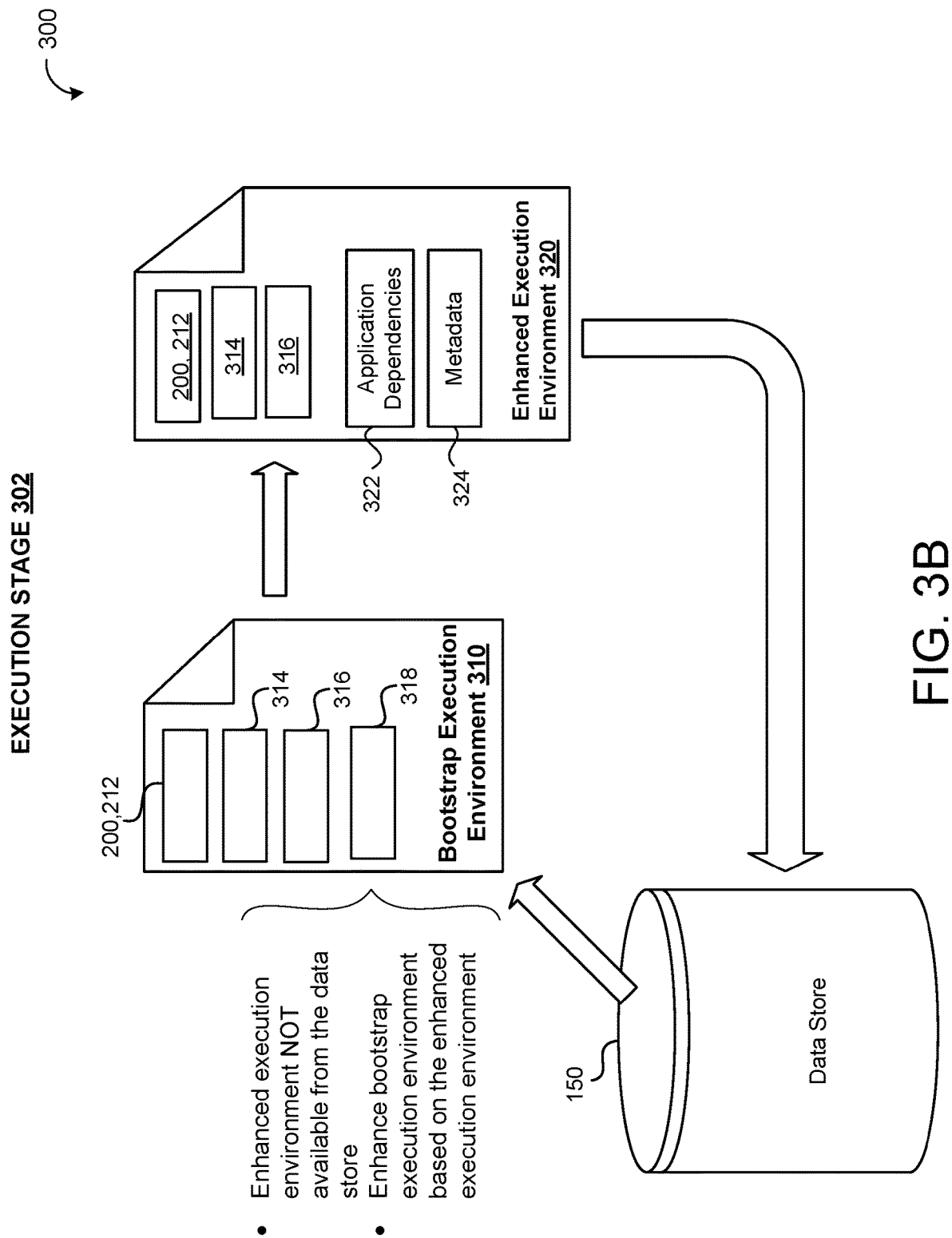

Referring to FIG. 3B, the container builder 300 executes the bootstrap execution environment 310 during the execution stage 302. The container builder 300 may receive (e.g., using the identifier 314) the bootstrap execution environment 310 from the data store 150 after building/creating/configuring the bootstrap execution environment 310 during the configuration stage 301 (FIG. 3A). In some examples, the container builder 300, upon creating/configuring the bootstrap execution environment 310 during the configuration stage 301, immediately executes the bootstrap execution environment 310 during the execution stage 302. The bootstrap execution environment 310 may include the software application 200, including the manifest of dependencies 212. In the example shown, the container builder 300 executes the bootstrap execution environment 310, causing the container builder 300 to perform the startup instructions 318. The startup instructions 318 may include determining whether an associated enhanced execution environment 320 is available from the data store 150. In the example shown in FIG. 3B, the data store 150 does not initially contain an enhanced execution environment 320. Accordingly, the container builder 300, while performing the startup instructions 318, determines that an associated enhanced execution environment 320 is not available from the data store 150. For instance, the container builder 300 may query the data store 150 using an identifier 314 to determine whether the data store 150 contains the associated enhanced execution environment 320. The identifier 314 may be associated with a version of the software application 200. In some examples, the container builder 300 determines that the enhanced execution environment 320 is not available when a version number of the software application 200 associated with the bootstrap execution environment 310 (and included in the build request 180) is not the same as the version of the software application 200 associated with the stored enhanced execution environment 320.

When the container builder 300 determines that an associated enhanced execution environment 320 is not available from the data store 150, the startup instructions 318 include operations/steps to enhance the bootstrap execution environment 310 based on the manifest of dependencies 212. The container builder 300 may enhance the bootstrap execution environment 310 to build/create/configure the enhanced execution environment 320. The container builder 300 may enhance the bootstrap execution environment 310 by installing (e.g., downloading, copying, compiling) application dependencies 322. In some examples, the container builder 300 installs application dependencies 322 prior to executing the software application 200. As previously described, the container builder 300 may execute commands, such as package-manager commands included in the manifest of dependencies 212, to create (e.g. install) the application dependencies 322. In some examples, the container builder 300 executes the software application 200 to create the application dependencies 322. The container builder 300 may execute/run the software application 200, causing the software application 200 to execute statements requiring or importing support libraries, files, or other application dependencies 322. Accordingly, the container builder 300 enhances the bootstrap execution environment 310 with the imported application dependencies 322 to create the enhanced execution environment 320. The container builder 300 may execute the software application 200, causing application source code or a Common Intermediate Language (CIL), such as bytecode, to be compiled into architecture-specific machine code or binaries. For example, the container builder 300 may execute the software application 200 in a JIT execution engine. The JIT engine may compile modules of the software application 200 into JIT compiled modules, containing efficient machine code, when the modules of the software application 200 are first loaded or accessed. In some implementations, the container builder 300 creates some application dependencies 322 prior to executing the software application 200 and other application dependencies 322 by executing/running the software application 200. The container builder 300 may use other techniques for dynamically creating application dependencies 322.

Dynamic content (e.g. application dependencies 322) may be architecture-specific. That is, the application dependencies 322 may be compatible with a specific processor architecture and/or a specific operating system version associated with the bootstrap execution environment 310 executed by the container builder 300 to create the application dependencies 322. For example, the application dependencies 322 may include files or modules including efficient, architecture-specific machine code or binaries, and/or just-in-time compiled modules created by a JIT execution engine. In some implementations, after the container builder 300 enhances the bootstrap execution environment 310 to include dynamically created application dependencies 322, the enhanced execution environment 320 no longer needs to perform steps of the startup instructions 318 associated with creating the application dependencies 322. Accordingly, the container builder 300 may omit the startup instructions 318 from the enhanced execution environment 320. The container builder 300 may add metadata 324 to the enhanced execution environment 320 indicating an operating system version associated with the bootstrap execution environment 310 and/or a processor architecture associated with the bootstrap execution environment 310 that created the enhanced execution environment 320. In some examples, the architecture-specific content (e.g. application dependencies 322) include metadata indicating the operating system version and/or processor architecture associated with the bootstrap execution environment 310. The container build may use other techniques to creating/configuring the enhanced execution environment 320.

FIG. 3B also shows the container builder 300 performing further steps of the startup instructions 318 that include storing the enhanced execution environment 320 in the data store 150. In some implementations, the container builder 300 uses the tooling 316 to store the enhanced execution environment 320. For example, the data store 150 may include a container registry. The container builder 300 may use the tooling 316 to create a container image including the enhanced execution environment 320. The enhanced execution environment 320 may include the contents of the bootstrap execution environment 310 (e.g. static contents) and the application dependencies 322 (dynamic contents) created by the container builder 300. The container builder 300 may further use the tooling 316 to upload the container image including the enhanced execution environment 320 to the container registry (e.g. data store 150). The startup instructions 318 may further include tagging, annotating, indexing, or otherwise identifying the enhanced execution environment 320 to facilitate lookup and retrieval. For example, the startup instructions 318 may include adding an identifier 314 to the enhanced execution environment 320. For instance, the identifier 314 may indicate that the data store 150 contains an enhanced execution environment 320 associated with a version of the software application 200. The container builder 300 may add metadata 324 to the enhanced execution environment 320 to indicate aspects of the enhanced execution environment 320, such as the operating system version and/or the processor architecture of the remote system 140 executing the enhanced execution environment 320. For instance, the container builder 300 may "tag" or annotate the enhanced execution environment 320 with the metadata 324. In one example, the container builder 300 tags the enhanced execution environment 320 with metadata 324 indicating that the enhanced execution environment 320 was created on an Ubuntu LINUX system executing on the "x86_64" architecture. Other metadata 324 conventions or contents may be used as well.

Figure 3C:
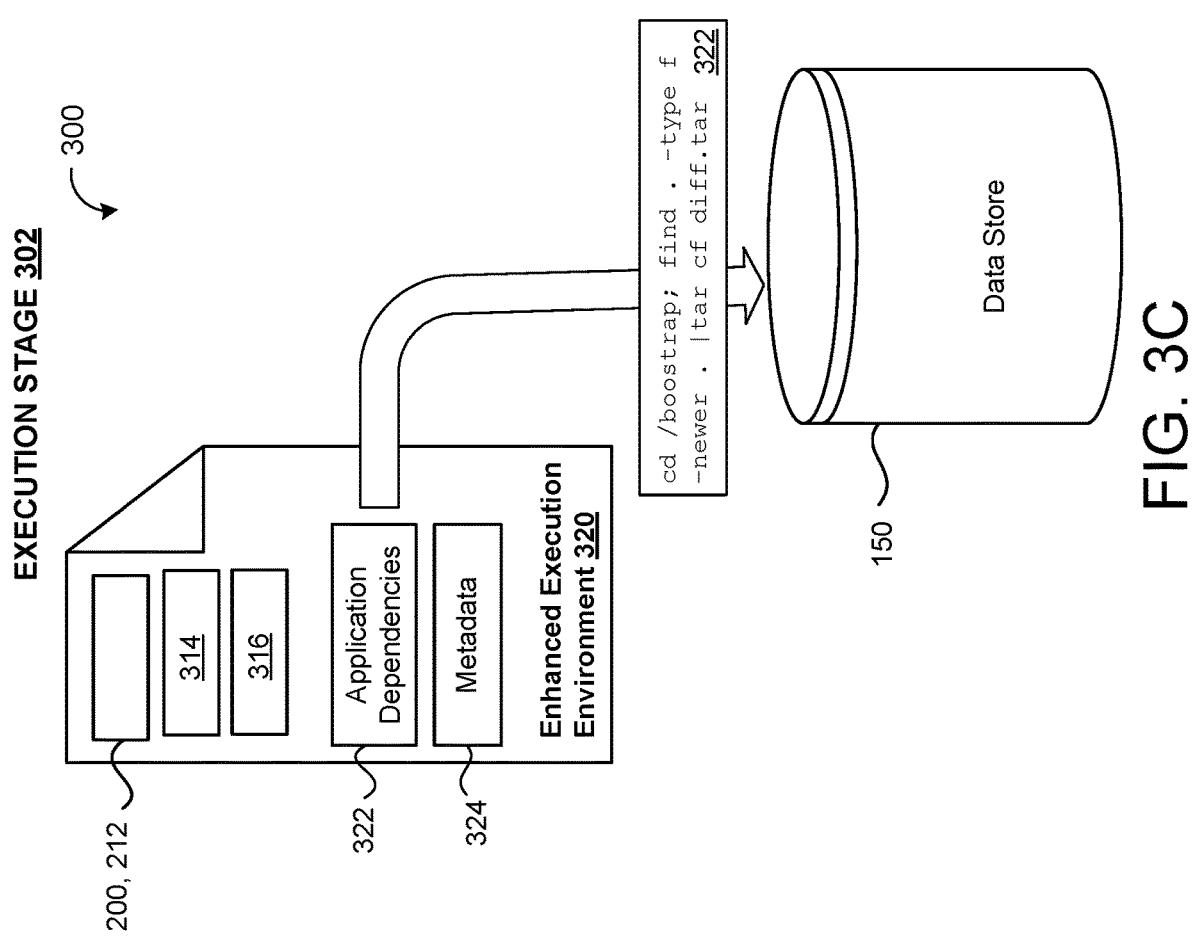

Referring to FIG. 3C, the container builder 300 may store a difference between the bootstrap execution environment 310 and the enhanced execution environment 320 in the data store 150. That is, the container builder 300 may store only the dynamically-created application dependencies 322 in the data store 150, e.g. to conserve space in the data store 150. Here, the dynamically-created application dependencies 322 for the enhanced execution environment may be stored in the data store 150 and include an associated identifier 314 (e.g., for later lookup and retrieval of the application decencies) and/or associated metadata 324 (e.g., to indicate aspects such as the operating system version and/or the processor architecture of the remote system 140 for executing the enhanced execution environment 320 associated with the dynamically-created application dependencies). For instance, the startup instructions 318 may include introspection to determine a difference between the bootstrap execution environment 310 and the enhanced execution environment 320 by identifying updated or dynamically-created application dependencies 322 during the execution stage 302. That is, the container builder 300 may determine/identify application dependencies 322 corresponding to files that were added or modified by enhancing the bootstrap execution environment 310. The container builder 300 may use the tooling 316 included in the bootstrap execution environment 310 to identify a set of updated files, i.e., files that were added or modified when the container builder 300 enhanced the bootstrap environment 310 by adding dynamic content (e.g., application dependencies 322). In some implementations, the container builder 300 uses standard operating-system commands or programming interfaces to determine files added or modified by enhancing the bootstrap execution environment 310 based on the manifest of dependencies 212. For example, the container builder 300 may use the UNIX "find" command to recursively search for changed files. The container builder 300 may use other techniques for determining enhancements to the bootstrap execution environment 310. In some implementations, the container builder 300 creates a UNIX "tar" file based on the recently added or modified files. The container builder 300 may store the "tar" file in the data store 150 as an enhanced execution environment 320 and tag the "tar" file to indicate that the enhanced execution environment 320 includes a difference, containing only the application dependencies 322, rather than a fully executable enhanced execution environment 320. When the bootstrap execution environment 310 is subsequently executed, the container builder 300 may enhance the bootstrap execution environment 310 based on the application dependencies 322 in the "tar" file received from the data store 150.

In contrast to the example shown in FIG. 3B where the container builder determined that an associated enhanced execution environment 320 is not available from the data store 150, FIG. 3D shows the container builder 300, while performing the startup instructions 318, determining that the associated enhanced execution environment 320 is available from the data store 150 (e.g., the data store 150 contains the associated enhanced execution environment 320. In some examples, the container builder 300 had previously created the enhanced execution environment 320 and stored the enhanced execution environment 320 in the data store 150. The previously created enhanced execution environment 320 may include an identifier 314 associating the enhanced execution environment 320 with a version of the software application 200. The container builder 300 may determine that the enhanced execution environment 320 is available when the enhanced execution environment 320 includes a "tag" (e.g., identifier 314) indicating that the enhanced execution environment 320 includes a suitable version (e.g., version number) of the software application 200. In some examples, the version number includes a major version number and a minor version number. In these examples, the container builder 300 may determine that an associated enhanced execution environment 320 is available from the data store 150 when the major software version number of the software application 200 associated with the bootstrap execution environment 310 is the same as the major version of the software application 200 associated with the stored enhanced execution environment 320.

The associated enhanced execution environment 320 may include metadata 324 indicating aspects of the enhanced execution environment 320, such as the operating system version and/or the processor architecture of the remote system 140 used to build the enhanced execution environment 320. The enhanced execution environment 320 may include an annotation or tag containing the metadata 324. The container builder 300 may determine that the enhanced execution environment 320 is available when the enhanced execution environment 320 includes metadata 324 indicating that aspects of the enhanced execution environment 320 are suitable, such as the operating system version and/or the processor architecture of the remote system 140 that built the enhanced execution environment 320. For example, the container builder 300 may determine that the enhanced execution environment 320 is not available from the data store 150 when the metadata 324 indicates a processor architecture that is incompatible with the bootstrap execution environment 310 (e.g., incompatible with the remote system 140 executing the bootstrap execution environment 310). In this example, the container builder 300 will proceed with performing the startup instructions 318 by enhancing the bootstrap execution environment 310 based on the manifest of dependencies 212 as described above with reference to FIG. 3B. Alternatively, the container builder 300 may determine that the enhanced execution environment 320 is available from the data store 150 when the metadata 324 associated with the enhanced execution environment 320 indicates an operating system version and a processor architecture that is compatible with the bootstrap execution environment 310. The container builder 300 may use other techniques to determine whether the enhanced execution environment 320 is available from the data store 150. The container builder 300 may use the tooling 316 included in the bootstrap execution environment 310 to determine whether the associated enhanced execution environment 320 is available. For example, the data store 150 may include a container registry. In this example, the tooling 316 may be capable of searching for a suitable enhanced execution environment 320 in the container registry (e.g. data store 150). The tooling may look up enhanced execution environment 320 using the software version identifier 314 and/or metadata 324, or using other techniques to determine that a suitable enhanced execution environment 320 is available from the data store 150.

In the example shown, when the container builder 300 determines that the associated enhanced execution environment 320 is available from the data store 150, the container builder 300 receives the enhanced execution environment 320 from the data store 150 and enhances the bootstrap execution environment 310 based on the enhanced execution environment 320. The container builder 300 may receive the enhanced execution environment 320 by downloading the enhanced execution environment 320, including the software application 200, from the data store 150 and enhance the bootstrap execution environment 310 by simply executing the downloaded enhanced execution environment 320 having dynamic content (e.g., application dependencies 322) instead of the bootstrap execution environment 310 having only the static content. In another example, instead of executing the downloaded enhanced execution environment 320, the container builder 300 enhances the bootstrap execution environment 310 based on the application dependencies 322 included in the downloaded enhanced execution environment 320. For instance, the container builder 300 may use the tooling 316 to download and install the application dependencies 322 from the associated enhanced execution environment 320 in the data store 150 into the bootstrap execution environment 310. Enhancing the bootstrap execution environment 310 based on the enhanced execution environment 320 may be more efficient than enhancing the bootstrap execution environment 310 based on the manifest of dependencies 312.

Figure 3E:
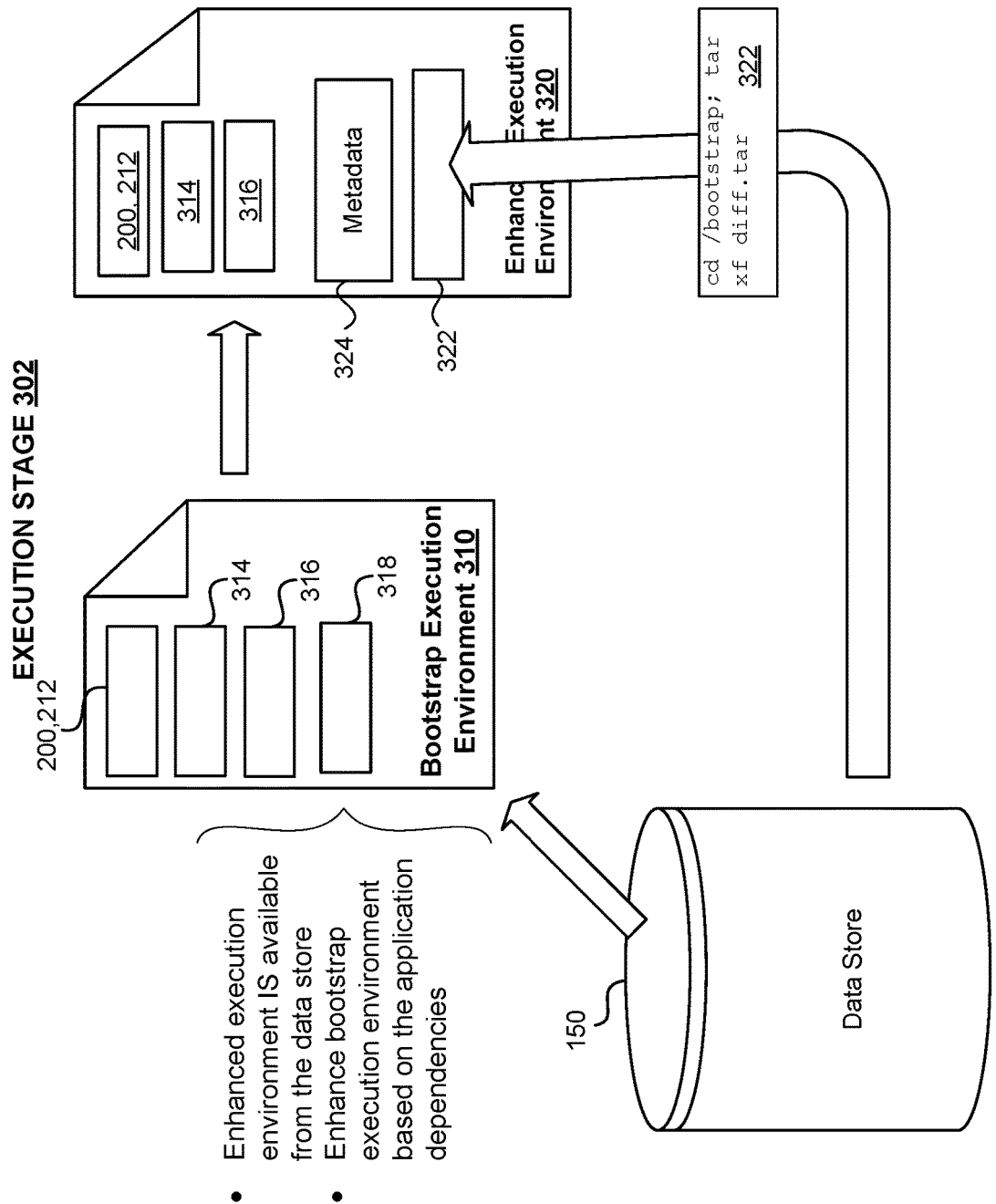

As described above with respect to FIG. 3C, the container builder 300 may store the difference between the bootstrap execution environment 310 and the enhanced execution environment 320 (i.e., the dynamically-created application dependencies 322) in the data store 150. Referring to FIG. 3E, when the container builder 300 performs the startup instructions 318 to whether the associated enhanced execution environment 320 is available from the data store 150, the container builder 300 may determine that a suitable difference is available from the data store 150. Here, the difference may include a container image including the application dependencies 322 that were dynamically created, compiled, downloaded, or otherwise marshalled during a previous execution of the software application 200, e.g. in the bootstrap execution environment 310. As described previously, the container builder 300 may use the identifier 314 of the received bootstrap execution environment 310 to look up the associated difference containing the application dependencies 322 in the data store 150. For example, the container builder 300 may determine that the difference is available from the data store 150 when the difference includes a "tag" (e.g., identifier 314) indicating that the difference was created using the same operating system version and/or the same processor architecture as the remote system 140. In some examples, the container builder 300 receives a container image (e.g., enhanced execution environment 320), including a UNIX "tar" file containing the application dependencies 322, from the data store 150. The container builder 300 may enhance the bootstrap execution environment 310 based on the application dependencies 322 contained in the received container image from the data store 150. The container builder 300 may use the tooling 316 to download the container image from the data store 150 and enhance the bootstrap execution environment 310 by installing the application dependencies 322. For example, the container builder 300 may extract the application dependencies 322 from the "tar" file. The container builder 300 may use other techniques for enhancing the bootstrap execution environment 310 based on the enhanced execution environment 320.

In some examples, after enhancing the bootstrap execution environment 310 during the execution stage 302, the container builder 300 executes the software application 200. Alternatively, the container builder 300 may execute the software application 200 in the bootstrap execution environment 310 to create application dependencies 322 (i.e. to create the enhanced execution environment 320). In this example, the software application 200 may continue to execute in the enhanced execution environment 320. In other words, the order of steps/operations of the startup instructions 318, e.g. the steps of creating the enhanced execution environment 320 and executing the software application 200, may be varied from the examples shown.

Figure 4:
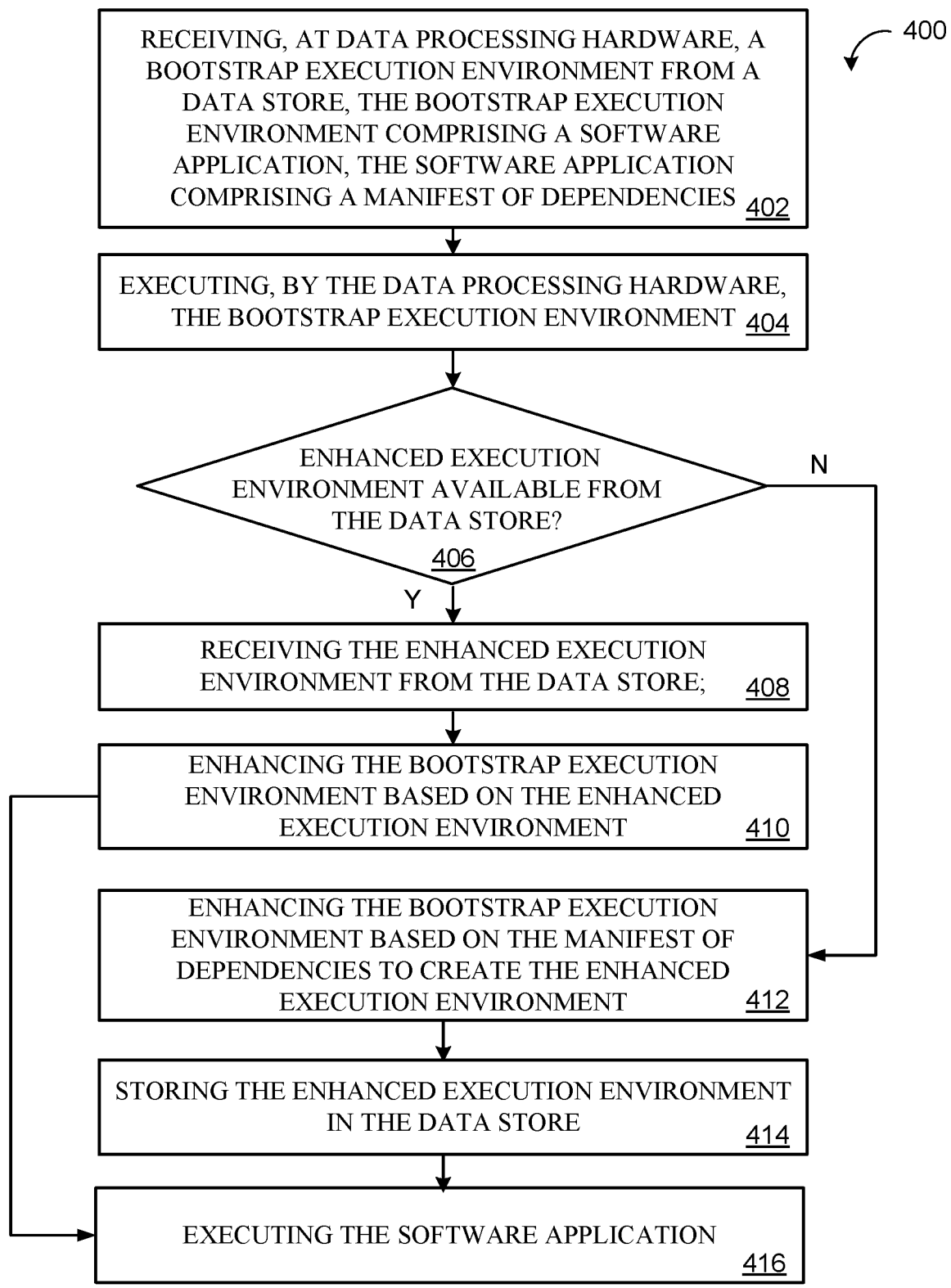
FIG. 4 is a flowchart of an example arrangement of operations for a method of configuring and deploying an execution environment for a software application.

FIG. 4 provides a flowchart of an example arrangement of operations for a method 400 of executing a software application 200 in an application execution environment. The software application may be one of a JavaScript application, a Python application, or a Ruby application. At operation 402, the method 400 includes receiving, at data processing hardware 144 (e.g., container builder 300), a bootstrap execution environment 310 from a data store 150. The bootstrap execution environment 310 includes the software application 200 and the software application 200 includes a manifest of dependencies 212. In some implementations, the data store 150 includes a container registry storing a container image including the bootstrap execution environment 310.

At operation 404, the method 400 includes executing, by the data processing hardware 144, the bootstrap execution environment 310 to cause the data processing hardware 144 to perform operations (e.g., by executing startup instructions 318 associated with the bootstrap execution environment 310). At operation 406, the method 400 includes determining whether an enhanced execution environment 320 is available from the data store 150. For example, determining whether the enhanced execution environment 320 is available from the data store 150 may include determining whether the enhanced execution environment 320 is compatible with at least one of the software application 200, an operating system version associated with the bootstrap execution environment 320, or a processor architecture associated with the bootstrap execution environment 320.

When an enhanced execution environment 320 is available from the data store 150, the method 400 includes, at operation 408, receiving the enhanced execution environment 320 from the data store 150. After receiving the enhanced execution environment 320 from the data store 150, the method 400 includes, at operation 410, enhancing the bootstrap execution environment 310 based on the enhanced execution environment 320. For example, enhancing the bootstrap execution environment 310 may include installing application dependencies 322 based on the enhanced execution environment 320. Application dependencies 322 may include at least one of a support library, an architecture-specific binary module, or a just-in-time compiled module. After enhancing the bootstrap execution environment 310 based on the enhanced execution environment 320, the method 400 includes, at operation 416, executing the software application 200.

When an enhanced execution environment 320 is not available from the data store 150, the method 400 includes, at operation 412, enhancing the bootstrap execution environment 310 based on the manifest of dependencies 212 to create the enhanced execution environment 320. After enhancing the bootstrap execution environment 310 based on the manifest of dependencies 212 to create the enhanced execution environment 320, the method 400 includes, at operation 414, storing the enhanced execution environment 320 in the data store 150. In some implementations, the method 400 also includes annotating, by the data processing hardware 144, the enhanced execution environment 320 in the data store 150 to indicate at least one of a version of the software application 200, an operating system version associated with the enhanced execution environment 320, or a processor architecture associated with the enhanced execution environment 320. After storing the enhanced execution environment 320 in the data store 150, the method 400 includes, at operation 416, executing the software application 200.

FIG. 5 is schematic view of an example computing device 500 that may be used to implement the systems and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (also referred to as data processing hardware), memory 520 (also referred to as memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high-speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, a bootstrap execution environment from a data store, the bootstrap execution environment comprising a software application, the software application comprising a manifest of dependencies; and
executing, by the data processing hardware, the bootstrap execution environment, causing the data processing hardware to perform operations comprising:
determining whether an enhanced execution environment is available from the data store;
when the enhanced execution environment is available from the data store:
receiving the enhanced execution environment from the data store, the enhanced execution environment comprising a set of application dependencies; and
executing the software application using the manifest of dependencies and the set of application dependencies; and
when the enhanced execution environment is not available from the data store:
prior to executing the software application, creating the set of application dependencies using the manifest of dependencies;
creating the enhanced execution environment using the bootstrap execution environment and the set of application dependencies;
storing the set of application dependencies in the data store; and
executing the software application using the manifest of dependencies and the set of application dependencies.

2. The method of claim 1, further comprising annotating, by the data processing hardware, the enhanced execution environment in the data store to indicate at least one of a version of the software application, an operating system version associated with the enhanced execution environment, or a processor architecture associated with the enhanced execution environment.

3. The method of claim 1, wherein determining whether the enhanced execution environment is available from the data store comprises determining whether the enhanced execution environment is compatible with at least one of the software application, an operating system version associated with the bootstrap execution environment, or a processor architecture associated with the bootstrap execution environment.

4. The method of claim 1, further comprising:
receiving, at the data processing hardware, a build request for the software application;
configuring, by the data processing hardware, the bootstrap execution environment based on the software application; and
storing, by the data processing hardware, the bootstrap execution environment in the data store.

5. The method of claim 1, wherein the bootstrap execution environment comprises a container image and the data store comprises a container registry.

6. The method of claim 1, wherein creating the set of application dependencies comprises executing the manifest of dependencies.

7. The method of claim 1, wherein the application dependencies comprise at least one of a support library, an architecture-specific binary module, or a just-in-time compiled module.

8. The method of claim 1, wherein the software application is one of a JavaScript application, a Python application, or a Ruby application.

9. A system comprising:
data processing hardware; and
memory hardware in communication with the data processing hardware, the memory hardware storing instructions that when executed on the data processing hardware cause the data processing hardware to perform operations comprising:
receiving a bootstrap execution environment from a data store, the bootstrap execution environment comprising a software application, the software application comprising a manifest of dependencies; and
executing the bootstrap execution environment, causing the data processing hardware to perform further operations comprising:
determining whether an enhanced execution environment is available from the data store;
when the enhanced execution environment is available from the data store:
receiving the enhanced execution environment from the data store, the enhanced execution environment comprising a set of application dependencies; and
executing the software application using the manifest of dependencies and the set of application dependencies; and
when the enhanced execution environment is not available from the data store:
prior to executing the software application, creating the set of application dependencies using the manifest of dependencies;
creating the enhanced execution environment using the bootstrap execution environment and the set of application dependencies;
storing the set of application dependencies in the data store; and
executing the software application using the manifest of dependencies and the set of application dependencies.

10. The system of claim 9, wherein the operations further comprise annotating the enhanced execution environment in the data store to indicate at least one of a version of the software application, an operating system version associated with the enhanced execution environment, or a processor architecture associated with the enhanced execution environment.

11. The system of claim 9, wherein determining whether the enhanced execution environment is available from the data store comprises determining whether the enhanced execution environment is compatible with at least one of the software application, an operating system version associated with the bootstrap execution environment, or a processor architecture associated with the bootstrap execution environment.

12. The system of claim 9, wherein the operations further comprise:
receiving a build request for the software application;
configuring the bootstrap execution environment based on the software application; and
storing the bootstrap execution environment in the data store.

13. The system of claim 9, wherein the bootstrap execution environment comprises a container image and the data store comprises a container registry.

14. The system of claim 9, wherein creating the set of application dependencies comprises executing the manifest of dependencies.

15. The system of claim 9, wherein the application dependencies comprise at least one of a support library, an architecture-specific binary module, or a just-in-time compiled module.

16. The system of claim 9, wherein the software application is one of a JavaScript application, a Python application, or a Ruby application.

* * * * *